(12) United States Patent  
Tanaka (10) Patent No.: US 9,217,938 B2  
(45) Date of Patent: Dec. 22, 2015

(54) ELECTROPHOTOGRAPHIC PHOTOSENSITIVE MEMBER, PROCESS CARTRIDGE, ELECTROPHOTOGRAPHIC APPARATUS AND PHTHALOCYANINE CRYSTAL

(71) Applicant: CANON KABUSHIKI KAISHA, Tokyo (JP)

(72) Inventor: Masato Tanaka, Tagata-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 14/101,292

(22) Filed: Dec. 9, 2013

(65) Prior Publication Data

US 2014/0170543 A1    Jun. 19, 2014

(30) Foreign Application Priority Data

Dec. 14, 2012  (JP) ................................. 2012-273727  
Nov. 22, 2013  (JP) ................................. 2013-242104

(51) Int. Cl.
| | |
|---|---|
| G03G 5/06 | (2006.01) |
| G03G 5/047 | (2006.01) |
| C09B 47/04 | (2006.01) |
| G03G 5/05 | (2006.01) |
| G03G 5/09 | (2006.01) |

(52) U.S. Cl.  
CPC ............... *G03G 5/047* (2013.01); *C09B 47/04* (2013.01); *G03G 5/0503* (2013.01); *G03G 5/0614* (2013.01); *G03G 5/0696* (2013.01); *G03G 5/09* (2013.01)

(58) Field of Classification Search  
CPC ... G03G 5/0696; G03G 5/0614; G03G 21/18; G03G 5/0638; G03G 5/0629; G03G 5/0633; C09B 47/04  
USPC .............................................. 430/59.4, 59.1  
See application file for complete search history.

(56) References Cited

U.S. PATENT DOCUMENTS 3,532,496 A * 10/1970 Chiang et al. .................... 430/95  
5,514,505 A * 5/1996 Limburg et al. ................. 430/41

(Continued)

FOREIGN PATENT DOCUMENTS

EP     1 997 857 A1   12/2008  
EP     2 402 819 A1   1/2012

(Continued)

OTHER PUBLICATIONS

English language machine translation of JP 2009-080403 (Apr. 2009).*

(Continued)

*Primary Examiner* — Christopher Rodee  
(74) *Attorney, Agent, or Firm* — Fitzpatrick, Cella, Harper and Scinto (57) ABSTRACT

An electrophotographic photosensitive member includes a support and a charge generating layer and a charge transporting layer formed on the support. The charge generating layer contains an amine compound represented by the following formula (1);

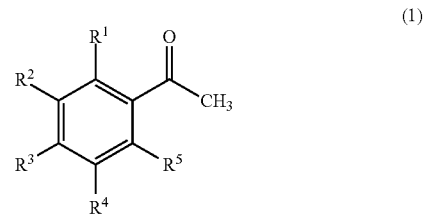

(1)

where $R^1$ to $R^5$ represent a hydrogen atom, halogen atom, hydroxy group, carboxyl group, alkoxycarbonyl group, aryloxycarbonyl group, alkyl group, alkoxy group, aryloxy group, amino group having a substituent group, or cyclic amino group; and at least one of $R^1$ to $R^5$ is an amino group substituted with an aryl group, amino group substituted with an alkyl group, or cyclic amino group.

13 Claims, 1 Drawing Sheet

(56) References Cited

U.S. PATENT DOCUMENTS

| | | |
|---|---|---|
| 7,333,752 B2 | 2/2008 | Kawahara et al. |
| 8,084,172 B2 | 12/2011 | Kurachi et al. |
| 8,415,078 B2 | 4/2013 | Tanaka et al. |
| 8,518,615 B2 | 8/2013 | Tanaka |

FOREIGN PATENT DOCUMENTS

| | | | |
|---|---|---|---|
| GB | 857391 A | | 12/1960 |
| JP | 59-30541 A | | 2/1984 |
| JP | 2001-11028 A | | 1/2001 |
| JP | 2007-138153 A | | 6/2007 |
| JP | 2009080403 A | * | 4/2009 |
| JP | 2009-301016 A | | 12/2009 |
| JP | 2011-94101 A | | 5/2011 |

OTHER PUBLICATIONS

European Search Report dated Apr. 4, 2014 in European Application No. 13005719.3.

U.S. Appl. No. 14/097,216, filed Dec. 4, 2013, Applicants: Tanaka, et al.

* cited by examiner

ELECTROPHOTOGRAPHIC PHOTOSENSITIVE MEMBER, PROCESS CARTRIDGE, ELECTROPHOTOGRAPHIC APPARATUS AND PHTHALOCYANINE CRYSTAL

BACKGROUND OF THE INVENTION

1. Field of the Invention

The present invention relates to an electrophotographic photosensitive member, a process cartridge and an electrophotographic apparatus each having an electrophotographic photosensitive member, and to a phthalocyanine crystal.

2. Description of the Related Art

Since a semiconductor laser commonly used in an image exposing device of an electrophotographic photosensitive member has a long oscillation wavelength in the range of 650 to 820 nm, electrophotographic photosensitive members having high sensitivity to light in the long wavelength range are currently under development. Electrophotographic photosensitive members having high sensitivity to the light of a semiconductor laser with a short oscillation wavelength is also recently under development so as to achieve high resolution images.

Azo pigments and phthalocyanine pigments are known as charge generating substances having high sensitivity to the light ranging from the long wavelength region to the short wavelength region.

Although an electrophotographic photosensitive member using an azo pigment or a phthalocyanine pigment has excellent sensitivity properties, a problem is that the generated photo carriers tend to remain in the photosensitive layer so as to act as a memory, easily causing potential variation such as ghosting in some cases.

In order to solve the problem of a phthalocyanine pigment, the phthalocyanine pigment has been used in combination with a specific azo pigment.

An acetophenone compound for use in an electrophotographic photosensitive member is described in Japanese Patent Application Laid-Open No. S59-30541, Japanese Patent Application Laid-Open No. 2007-138153 and Japanese Patent Application Laid-Open No. 2009-301016.

An acetylated benzene derivative for use as absorption wavelength shifting agent for a phthalocyanine vapor deposited film is described in Japanese Patent Application Laid-Open No. S59-30541.

Titanylphthalocyanine crystal having a main peak at a Bragg angle $2\theta$ of $27.2°$ in X-ray diffraction using CuK$\alpha$ radiation, produced by contacting a phthalocyanine crystal precursor with a fluorobenzene derivative, is described in Japanese Patent Application Laid-Open No. 2007-138153. According to its description, the titanylphthalocyanine crystal thus produced has both improved stability of the crystal and improved sensitivity.

According to Japanese Patent Application Laid-Open No. 2009-301016, an $\alpha$-aminoacetophenone compound as a polymerization initiator is added to the protective layer of a photosensitive member so as to improve the hardenability.

Various attempts have been made to improve electrophotographic photosensitive members as described above. For further improvement in high-quality images in recent years, it is desired to prevent image degradation due to ghosting in various environments.

SUMMARY OF THE INVENTION

An object of the present invention is to solve the problem and to provide an electrophotographic photosensitive member which reduces image defects due to ghosting not only under a normal temperature and normal humidity environment but also even under a low temperature and low humidity environment, especially severe conditions. Another object of the present invention is to provide a process cartridge and an electrophotographic apparatus each having the electrophotographic photosensitive member. A still another object of the present invention is to provide a phthalocyanine crystal which contains a specific amine compound in the crystal.

The present invention provides an electrophotographic photosensitive member including: a support; and a charge generating layer and a charge transporting layer formed on the support; wherein the charge generating layer includes a charge generating substance; and an amine compound represented by the following formula (1):

In the formula (1), $R^1$ to $R^5$ each independently represents a hydrogen atom, a halogen atom, a hydroxy group, a carboxyl group, an alkoxycarbonyl group, an aryloxycarbonyl group, a substituted or unsubstituted alkyl group, a substituted or unsubstituted alkoxy group, a substituted or unsubstituted aryloxy group, an amino group having a substituent group, or a substituted or unsubstituted cyclic amino group. At least one of $R^1$ to $R^5$ is an amino group substituted with a substituted or unsubstituted aryl group, an amino group substituted with a substituted or unsubstituted alkyl group, or a substituted or unsubstituted cyclic amino group.

The present invention also provides a process cartridge detachably attachable to a main body of an electrophotographic apparatus, wherein the process cartridge integrally supports the electrophotographic photosensitive member and at least one device selected from the group consisting of a charging device, a developing device, a transfer device and a cleaning device.

The present invention also provides an electrophotographic apparatus having the electrophotographic photosensitive member, with a charging device, an image exposing device, a developing device and a transfer device.

The present invention also provides a phthalocyanine crystal in which a compound represented by the formula (1) is contained.

The present invention can provide an electrophotographic photosensitive member which reduces image defects due to ghosting not only under a normal temperature and normal humidity environment but also even under a low temperature and low humidity environment, especially severe conditions. The present invention can also provide a process cartridge and an electrophotographic apparatus each having the electrophotographic photosensitive member. The present invention can also provide a phthalocyanine crystal having excellent properties as a charge generating substance.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An amine compound contained in the charge generating layer of the electrophotographic photosensitive member of the present invention has a structure represented by the following formula (1).

(1)

In the formula (1), $R^1$ to $R^5$ each independently represents a hydrogen atom, a halogen atom, a hydroxy group, a carboxyl group, an alkoxycarbonyl group, an aryloxycarbonyl group, a substituted or unsubstituted alkyl group, a substituted or unsubstituted alkoxy group, a substituted or unsubstituted aryloxy group, an amino group having a substituent group, or a substituted or unsubstituted cyclic amino group. At least one of $R^1$ to $R^5$ is an amino group substituted with a substituted or unsubstituted aryl group, an amino group substituted with a substituted or unsubstituted alkyl group, or a substituted or unsubstituted cyclic amino group.

At least one of $R^1$ to $R^5$ in the formula (1) can be an amino group substituted with a substituted or unsubstituted alkyl group. More preferably, the amino group substituted with a substituted or unsubstituted alkyl group is a dialkylamino group in particular.

Furthermore preferably, the dialkylamino group is a dimethylamino group or a diethylamino group.

More preferably, the amine compound is an amine compound represented by the following formula (2) in particular.

(2)

$R^6$ or $R^7$ in the formula (2) each independently represents a methyl group or an ethyl group.

At least one of $R^1$ to $R^5$ in the formula (1) can be a substituted or unsubstituted cyclic amino group. Examples of the substituted or unsubstituted cyclic amino group include a substituted or unsubstituted piperazinyl group, a substituted or unsubstituted pyrrolidinyl group, a substituted or unsubstituted pyrrolyl group, a substituted or unsubstituted triazolyl group, a substituted or unsubstituted imidazolyl group, a substituted or unsubstituted pyridyl group, a substituted or unsubstituted pyrazinyl group, a substituted or unsubstituted pyrimidinyl group, a substituted or unsubstituted triazinyl group, a substituted or unsubstituted quinolyl group, a substituted or unsubstituted indolinyl group, a substituted or unsubstituted acridinyl group, a substituted or unsubstituted morpholinyl group, a substituted or unsubstituted piperidyl group, a morpholino group, and a substituted or unsubstituted piperidino group. The cyclic amino group can be a 3 to 8-member cyclic amino group. At least one carbon atom constituting the ring may be substituted with an oxygen atom, a nitrogen atom or the like. A morpholino group or a piperidino group, which is a 6-member cyclic amino group, is preferred in particular.

More preferably, the amine compound is an amine compound represented by the following formula (3).

(3)

Examples of the substituent group which each of the substituted alkyl group, the substituted alkoxy group, the substituted aryloxy group, the substituted amino group, the substituted aryl group and the substituted cyclic amino group in the formula (1) may have include an alkyl group such as a methyl group, an ethyl group, a propyl group and a butyl group, an arylalkyl group such as a benzyl group, an alkoxy group such as a methoxy group and an ethoxy group, a dialkylamino group such as a dimethylamino group and a diethylamino group, an alkoxycarbonyl group such as a methoxycarbonyl group and an ethoxycarbonyl group, a phenyl group, a naphthyl group, a biphenylyl group, a nitrophenyl group, a tolyl group, a bromophenyl group, a cyanophenyl group, a methoxyphenyl group, an acetylphenyl group, a nitro group, a cyano group, a formyl group, an alkoxy group, an acetyl group, an halogen atom such as a fluorine atom, a chlorine atom and a bromine atom, a hydroxy group and a halomethyl group. An alkyl group in particular is a preferred substituent group.

The charge generating layer of the present invention may be a layer which contains a phthalocyanine crystal which contains an amine compound represented by the formula (1) in the crystal.

The preferred substituent groups of $R^1$ to $R^5$ in the formula (1) contained in a phthalocyanine crystal are the same as the preferred substituent groups of the amine compound represented by the formula (1) contained in a charge generating layer.

Although specific examples (exemplary compounds) of the amine compound contained in the charge generating layer of the electrophotographic photosensitive member of the present invention and the amine compound contained in the phthalocyanine crystal are described in the following, the present invention is not limited thereto.

Exemplary compound (1)

Exemplary compound (2)

Exemplary compound (3)

Exemplary compound (4)

Exemplary compound (5)

Exemplary compound (6)

Exemplary compound (7)

-continued

Exemplary compound (8)

Exemplary compound (9)

Exemplary compound (10)

Exemplary compound (11)

Exemplary compound (12)

Exemplary compound (13)

Exemplary compound (14)

Exemplary compound (15)

Exemplary compound (16)

Exemplary compound (17)

Exemplary compound (18)

Exemplary compound (19)

Exemplary compound (20)

Exemplary compound (21)

Exemplary compound (22)

Exemplary compound (23)

Exemplary compound (24)

Exemplary compound (25)

The amine compound used in the present invention may be commercially available or may be synthesized, for example, as described below.

Aminoacetophenone is used as a raw material. A substituent group can be introduced into the amino group through a substitution reaction between aminoacetophenone and a halide. The reaction between aminoacetophenone and an aromatic halide in the presence of a metal catalyst in particular is useful for synthesizing an amine compound substituted with an aryl group. Alternatively, a reductive amination reaction is useful for synthesizing an amine compound substituted with an alkyl group.

Alternatively, halogenated acetophenone is used as a raw material. An amino group can be introduced into the position of the halogen group through a substitution reaction between a halogenated acetophenone and an amine.

A specific synthesis example of the exemplary compound (3) is described in the following. In the synthesis example, "parts" means "parts by mass." Infrared (IR) absorption spectrum was measured with a Fourier transform infrared spectroscopy photometer (trade name: FT/IR-420, made by Jasco Corporation). Nuclear magnetic resonance (NMR) spectrum was measured with a nuclear magnetic resonance apparatus (trade name: R-90, made by Hitachi, Ltd).

Synthesis Example 1

Synthesis of the Exemplary Compound (3)

In an eggplant shaped flask containing 1,500 parts of toluene under nitrogen stream, 344 parts of dry cesium carbonate, 3.4 parts of palladium acetate, 13 parts of (s)-BINAP (2,2'-bis(diphenylphosphino)-1,1'-binaphthyl), 150 parts of 4'-bromoacetophenone, 100 parts of morpholine were added. The mixture was heated and agitated at 100° C. for 15 hours. After cooling, 500 parts of chloroform was added and the reaction liquid was filtrated with a strainer paved with sellite. The solvent in the filtrate was distilled under reduced pressure. The residue was refined in a silica gel column (solvent: toluene/ethyl acetate) to produce 82 parts of the yellow crystal of exemplary compound (3).

The characteristic peaks of a measured IR absorption spectrum and a measured $^1$H-NMR spectrum are described in the following.

IR (cm$^{-1}$, KBr): 2844, 1661, 1600, 1244, 1121, 930, 822
$^1$H-NMR (ppm, CDCL$_3$): δ=7.88 (d, 2H), 6.86 (d, 2H), 3.8-3.9 (m, 4H), 3.2-3.4 (m, 4H), 2.52 (s, 3H)

The charge generating substance contained in the charge generating layer can be a phthalocyanine pigment or an azo pigment, due to having high sensitivity. A phthalocyanine pigment or a phthalocyanine crystal is more preferred in particular.

Examples of the phthalocyanine pigment or the phthalocyanine crystal include metal-free phthalocyanine and metal phthalocyanine, which may include an axial ligand or a substituent group. Among phthalocyanine pigments and phthalocyanine crystals, an oxytitanium phthalocyanine crystal and a gallium phthalocyanine crystal are preferred, being effective for the present invention, with excellent sensitivity, while easily causing ghosting.

Among gallium phthalocyanine crystals, a hydroxygallium phthalocyanine crystal in a crystalline form having peaks at Bragg angles 2θ of 7.4°±0.3° and 28.2°±0.3° in X-ray diffraction with CuKα radiation, a chlorogallium phthalocyanine crystal in a crystalline form having peaks at Bragg angles 2θ±0.2° of 7.4°, 16.6°, 25.5° and 28.3° in X-ray diffraction with CuKα radiation are preferred. Among oxytitanium phthalocyanine crystals, an oxytitanium phthalocyanine crystal in a crystalline form having a peak at Bragg angle 2θ of 27.2°±0.2° is preferred.

A hydroxygallium phthalocyanine crystal in a crystalline form having peaks at Bragg angles 2θ of 7.4°±0.3° and 28.2°±0.3° is preferred in particular.

A hydroxygallium phthalocyanine crystal in a crystalline form having peaks at Bragg angles 2θ±0.2° of 7.3°, 24.9° and 28.1° with the most intense peak at 28.1° is more preferred in particular. A hydroxygallium phthalocyanine crystal in a crystalline form having peaks at Bragg angles 2θ±0.2° of 7.5°, 9.9°, 16.3°, 18.6°, 25.1° and 28.3° is also preferred.

Examples of the phthalocyanine which constitutes the phthalocyanine crystal which contains an amine compound represented by the formula (1) in the crystal include a metal-free phthalocyanine and a metal phthalocyanine which may have an axial ligand. The phthalocyanine may have a substituent group. An oxytitanium phthalocyanine crystal and a gallium phthalocyanine crystal are preferred in particular, being effective for the present invention, with excellent sensitivity, while easily causing ghosting.

As described below, examples of the gallium phthalocyanine to constitute the gallium phthalocyanine crystal which contains an amine compound represented by the formula (1) in the crystal include a gallium phthalocyanine molecule of which gallium atom has an axial ligand of a halogen atom, a hydroxy group or an alkoxy group. The phthalocyanine ring may include a substituent group such as a halogen atom.

A gallium phthalocyanine crystal further containing N,N-dimethylaminoformamide in the crystal is preferred.

Among gallium phthalocyanine crystals, a hydroxygallium phthalocyanine crystal, a bromo-gallium phthalocyanine crystal and an iodo-gallium phthalocyanine crystal, having excellent sensitivity, are preferred, being effective for the present invention. A hydroxygallium phthalocyanine crystal is preferred in particular. The hydroxygallium phthalocyanine crystal includes a gallium atom having an axial ligand of hydroxy group. The bromo-gallium phthalocyanine crystal includes a gallium atom having an axial ligand of bromine atom. The iodo-gallium phthalocyanine crystal includes a gallium atom having an axial ligand of iodine atom.

Among hydroxygallium phthalocyanine crystals, a hydroxygallium phthalocyanine crystal having peaks at Bragg angles 2θ of 7.4°±0.3° and 28.3°±0.3° in X-ray diffraction with CuKα radiation in particular is more preferred, having effect of reducing image defects due to ghosting.

The content of an amine compound represented by the formula (1) contained in the phthalocyanine crystal can be 0.05% by mass or more and 3.0% by mass or less.

In the phthalocyanine crystal which contains an amine compound represented by the formula (1) in the crystal, the amine compound represented by the formula (1) is incorporated into the crystal.

A manufacturing method for a phthalocyanine crystal which contains an amine compound represented by the formula (1) in the crystal is described below. The phthalocyanine crystal which contains an amine compound represented by the formula (1) in the crystal can be obtained by mixing phthalocyanine produced by acid pasting and an amine compound represented by the formula (1) with a solvent and by wet milling treatment for conversion into crystals.

The milling treatment is a treatment in a milling device such as a sand mill and a ball mill, using dispersion material such as glass beads, steel beads and alumina balls. The milling time can be about 10 to 60 hours. In a particularly preferred method, sampling is performed with an interval of 5 to 10 hours for examining the Bragg angle of the crystal. The amount of dispersion material in milling treatment can be 10 to 50 times the amount of gallium phthalocyanine by mass. Examples of the solvent for use include an amide solvent such as N,N-dimethylformamide, N,N-dimethylacetoamide, N-methylformamide, N-methylacetoamide and N-methylpropionamide, a halogen solvent such as chloroform, an ether solvent such as tetrahydrofuran, a sulfoxide solvent such as dimethyl sulfoxide. The amount of solvent used can be 5 to 30 times the amount of phthalocyanine by mass. The amount of an amine compound represented by the formula (1) used can be 0.1 to 30 times the amount of phthalocyanine by mass.

In the present invention, the measurement data of the obtained phthalocyanine crystal by NMR measurement and thermogravimetric (TG) measurement were analyzed to determine whether the phthalocyanine crystal of the present invention contained an amine compound represented by the formula (1) in the crystal.

For example, when a milling treatment was performed with a solvent for dissolving an amine compound represented by the formula (1) or when a cleaning was performed after milling, NMR measurement of the obtained phthalocyanine crystal was performed. When a compound represented by the formula (1) was detected from the obtained phthalocyanine crystal, it was determined that an amine compound represented by the formula (1) was contained in the crystal.

On the other hand, when an amine compound represented by the formula (1) was insoluble in the solvent for use in the milling treatment and insoluble in the cleaning solvent after milling, NMR measurement of the obtained phthalocyanine crystal was performed. When an amine compound represented by the formula (1) was detected, determination was performed by the following method.

The TG measurement of each of the phthalocyanine crystal obtained by adding an amine compound represented by the formula (1), a phthalocyanine crystal prepared in the same way except that no amine compound represented by the formula (1) was added, and an amine compound represented by the formula (1) alone was individually performed. When the TG measurement results of the phthalocyanine crystal obtained by adding an amine compound were interpreted as a mixture of the individual measurement results of the phthalocyanine crystal prepared without addition of an amine compound and an amine compound in a predetermined ratio, it was determined that the phthalocyanine crystal and an amine compound formed a simple mixture or that an amine compound was attached to the surface of the phthalocyanine crystal.

On the other hand, when the TG measurement results of the phthalocyanine crystal obtained by adding an amine compound showed the weight reduction increase at a temperature higher than the completion temperature of the weight reduction for the amine compound alone in comparison with the TG measurement results of the phthalocyanine crystal prepared without addition of an amine compound, it was determined that an amine compound represented by the formula (1) was contained in the crystal.

The TG measurement, the X-ray diffraction analysis and the NMR measurement of the phthalocyanine crystal of the present invention were performed under the following conditions.

[TG Measurement]
Measurement instrument: A simultaneous TG/DTA measurement device made by Seiko Instruments Inc. (Trade name: TG/DTA 220U)
Atmosphere: Nitrogen stream (300 cm$^3$/min)
Measurement range: 35° C. to 600° C.
Rate of temperature increase: 10° C./min

[Powder X-Ray Diffraction Analysis]
Measurement instrument: X-ray diffraction analyzer RINT-TTRII made by Rigaku Corporation
X-ray tube: Cu
X-ray tube voltage: 50 KV
X-ray tube current; 300 mA
Scanning method: 2θ/θ scan
Scanning rate: 4.0°/min
Sampling interval: 0.02°
Starting angle (2θ): 5.0°
Stopping angle (2θ): 40.0°
Attachment: Standard sample holder
Filter: non-use
Incident monochrome: in-use
Counter monochrometer: non-use
Divergence slit: open
Vertical divergence limiting slit: 10.00 mm
Scattering slit: open
Light receiving slit: open
Flat plate monochrometer: in-use
Counter: scintillation counter

[NMR Measurement]
Measurement instrument: AVANCE III 500 made by Bruker
Solvent: deuterium sulfate (D$_2$SO$_4$)

The phthalocyanine crystal which contains a compound represented by the formula (1) of the present invention in the crystal has an excellent function as a photoconductive material, and is applicable to a solar cell, a sensor, a switching device and the like, in addition to an electrophotographic photosensitive member.

The electrophotographic photosensitive member of the present invention includes a charge generating layer which contains a charge generating substance and a charge transporting layer which contains a charge transporting substance, as photosensitive layers. Although either one of the charge generating layer and the charge transporting layer may be an upper layer (surface side), it is more preferred that the charge generating layer be a lower layer (support side).

A support having electrical conductivity (conductive support) is suitable for use. Examples of the conductive support include a support made of metal (alloy) such as aluminum and stainless steel, and a support made of metal, alloy, plastic or paper having a surface coated with a conductive film. The shape of the support can be, for example, in a cylindrical shape or a film shape.

An undercoat layer (also referred to as intermediate layer) having a barrier function and an adhesive function may be disposed between the support and the photosensitive layer (charge transporting layer or charge generating layer).

The undercoat layer can be formed by applying a coating liquid for forming an undercoat layer on a support or a conductive layer described below and drying the produced coating film. The coating liquid is prepared by dissolving a resin in a solvent. Examples of the resin include polyvinyl alcohol, polyethylene oxide, ethyl cellulose, methyl cellulose, casein, polyamide, glue and gelatin. The undercoat layer can have a film thickness of 0.3 to 5.0 μm.

A conductive layer may be disposed between the support and the undercoat layer in order to cover the irregularities and flaws on the surface of the support and reduce interference stripes.

The conductive layer can be formed by applying a coating liquid for forming a conductive layer on a support and drying and curing the produced coating film. The coating liquid for forming the conductive layer is prepared by dispersing conductive particles such as carbon black, metal particles and metal oxide particles and a binding resin in a solvent. The conductive layer can have a film thickness of 5 to 40 μm, more preferably 10 to 30 μm.

The charge generating layer can be formed by applying a coating liquid for forming a charge generating layer and drying the produced coating film. The coating liquid for forming a charge generating layer is prepared by dispersing an amine compound and a charge generating substance, or a phthalocyanine crystal containing an amine compound, and a binding resin in a solvent. The charge generating layer can have a film thickness of 0.05 to 1 μm, more preferably 0.1 to 0.3 μm.

The content of the amine compound in the charge generating layer can be 0.05% by mass or more and 15% by mass or less relative to the total mass of the charge generating layer, more preferably 0.1% by mass or more and 10% by mass or less. The content of the amine compound in the charge generating layer can be 0.1% by mass or more and 20% by mass or less relative to the charge generating substance, more preferably 0.3% by mass or more and 10% by mass or less.

The content of the charge generating substance in the charge generating layer can be 30% by mass or more and 90% by mass or less relative to the total mass of the charge generating layer, more preferably 50% by mass or more and 80% by mass or less.

The amine compound contained in the charge generating layer may be noncrystalline or crystalline. Two or more kinds of the amine compounds may be used in combination.

Examples of the binding resin for use in a charge generating layer include polyester, an acrylic resin, a phenoxy resin, polycarbonate, polyvinylbutyral, polystyrene, polyvinyl acetate, polysulfone, polyarylate, vinylidene chloride, acrylonitrile copolymer and polyvinyl benzal. Polyvinylbutyral and polyvinyl benzal are preferred in particular.

The charge transporting layer can be formed by applying a coating liquid for forming a charge transporting layer and drying the produced coating film. The coating liquid for forming a charge transporting layer is prepared by dissolving a charge transporting substance and a binding resin in a solvent.

The charge transporting layer can have a film thickness of 5 to 40 µm, more preferably 10 to 25 µm.

The content of the charge transporting substance can be 20% by mass or more and 80% by mass or less relative to the total mass of the charge transporting layer, more preferably 30% by mass or more and 60% by mass or less.

Examples of the charge transporting substance include a triarylamine compound, a hydrazone compound, a stilbene compound, a pyrazoline compound, an oxazole compound, a thiazole compound and a triallylmethane compound. A triarylamine compound is preferred in particular.

Examples of the binding resin for use in the charge transporting layer include polyester, an acrylic resin, a phenoxy resin, polycarbonate, polystyrene, polyvinyl acetate, polysulfone, polyarylate, vinylidene chloride, acrylonitrile copolymer. Polycarbonate and polyarylate are preferred in particular.

Examples of the application method of a coating liquid for forming each layer include immersion coating (dip coating), spray coating, spinner coating, bead coating, blade coating and beam coating.

A protective layer may be provided on the photosensitive layer (charge generating layer or charge transporting layer) so as to protect the photosensitive layer.

The protective layer can be formed by applying a coating liquid for forming a protective layer, which is prepared by dissolving a resin in a solvent, on the photosensitive layer, and drying and curing the produced coating film. The coating film may be cured with heating, electron beams or ultraviolet rays. Examples of the resin for use in the protective layer include polyvinylbutyral, polyester, polycarbonate (e.g., polycarbonate Z and modified polycarbonate), nylon, polyimide, polyarylate, polyurethane, a styrene-butadiene copolymer, a styrene-acrylic acid co-polymer and a styrene-acrylonitrile co-polymer.

The protective layer can have a film thickness of 0.05 to 20 µm.

The protective layer may contain conductive particles, an ultraviolet absorbing agent, or lubricating particles such as fluorine atom-containing resin particles. Examples of the conductive particles include metal oxide particles such as tin oxide particles.

Figure 1:
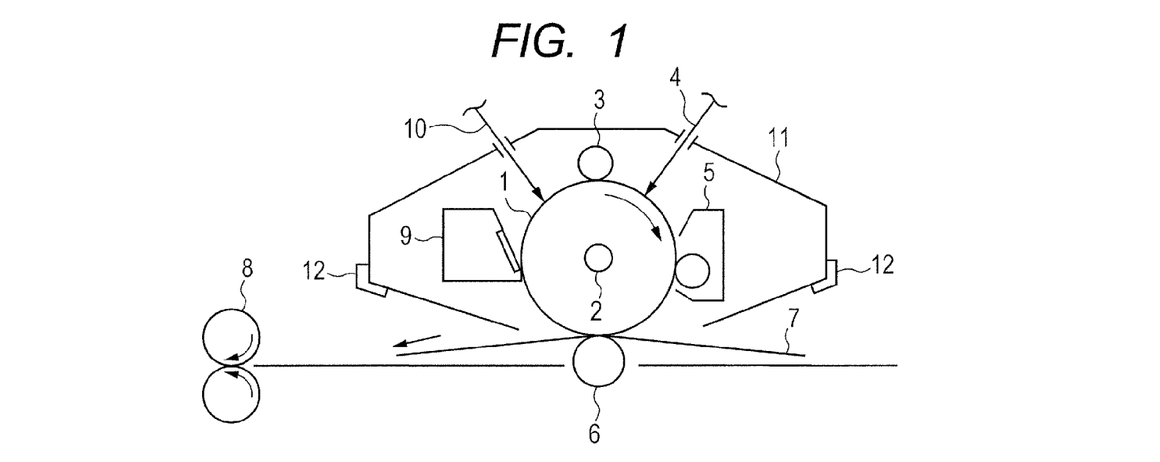
FIG. 1 is a schematic view of an electrophotographic apparatus provided with a process cartridge having an electrophotographic photosensitive member.

FIG. 1 is a schematic view of an electrophotographic apparatus provided with a process cartridge having an electrophotographic photosensitive member of the present invention.

An electrophotographic photosensitive member 1 having a cylindrical shape (drum shape), is rotation driven around an axis 2 at a predetermined circumferential speed (process speed) in an arrow direction.

The surface of the electrophotographic photosensitive member 1 is electrostatically charged to a positive or negative predetermined potential with a charging device 3 during in a rotation process. Subsequently the surface of the electrophotographic photosensitive member 1 is irradiated with image exposing light 4 from an image exposing device (not drawn in figure) so as to form an electrostatic latent image corresponding to objective image information. The image exposing light 4 are intensity-modulated in response to the time-series electric digital image signals of objective image information, outputted from, for example, an image exposing device for slit exposing or exposing with scanning laser beams.

The electrostatic latent image formed on the surface of the electrophotographic photosensitive member 1 is developed (normal development or reversal development) with toner stored in a developing device 5 so as to form a toner image on the surface of the electrophotographic photosensitive member 1. The toner image formed on the surface of the electrophotographic photosensitive member 1 is transferred to a transfer material 7 with a transfer device 6. On this occasion, a bias voltage having a polarity reversal of the charge retained on the toner is applied to the transfer device 6 from a bias power supply (not drawn in figure). A transfer material 7 of paper is taken out from a paper feeding part (not drawn in figure) so as to be fed between the electrophotographic photosensitive member 1 and the transfer device 6 in synchronization with the rotation of the electrophotographic photosensitive member 1.

The transfer material 7 having a toner image transferred from the electrophotographic photosensitive member 1 is separated from the surface of the electrophotographic photosensitive member 1 and transported to an image fixation device 8 for the fixation of the toner image. An image formed object (print or copy) is thus printed out from an electrophotographic apparatus.

After transfer of the toner image to the transfer material 7, the surface of the electrophotographic photosensitive member 1 is cleaned with a cleaning device 9 to remove attached material such as toner (remaining toner after transfer). In a recently developed cleaner-less system, toner may be directly removed after transfer with a development apparatus or the like. Subsequently the surface of the electrophotographic photosensitive member 1 is neutralized with pre-exposing light 10 from a pre-exposing device (not drawn in figure) and then repeatedly used for image formation. The pre-exposing device is not necessarily required for a contact charging device 3 having a charging roller.

A plurality of components selected from the group consisting of the electrophotographic photosensitive member 1, a charging device 3, a developing device 5 and a cleaning device 9 may be contained in a container and integrally supported to form a process cartridge detachable to an electrophotographic apparatus body. For example, at least one selected from the group consisting of a charging device 3, a developing device 5 and a cleaning device 9 is integrally supported together with the electrophotographic photosensitive member 1 so as to form a cartridge. The cartridge constitutes a process cartridge 11 detachable to an electrophotographic apparatus body with a guiding device 12 such as a rail of the electrophotographic apparatus body.

Image exposing light 4 may be reflected beams from or transmitted beams through a sheet of manuscript for an electrophotographic apparatus such as a copy machine and a printer. Alternatively, image exposing light 4 may be radiated beams produced by scanning of laser beams, driving of an LED array or driving of a liquid crystal shutter array in response to signals from a manuscript reading sensor.

The electrophotographic photosensitive member 1 of the present invention can be widely used in an electrophotography application field such as a laser beam printer, a CRT printer, an LED printer, a FAX, a liquid crystal printer and a laser engraving.

EXAMPLES

The present invention is described further in detail in reference to specific Examples in the following, although the present invention is not limited thereto. The film thickness of each of the layers of electrophotographic photosensitive members in Examples and Comparative Examples was obtained with an eddy-current film thickness meter (Fischerscope made by Fischer Instruments K.K.), or based on the specific gravity converted from a mass per unit area.

Example 1-1

Figure 2:
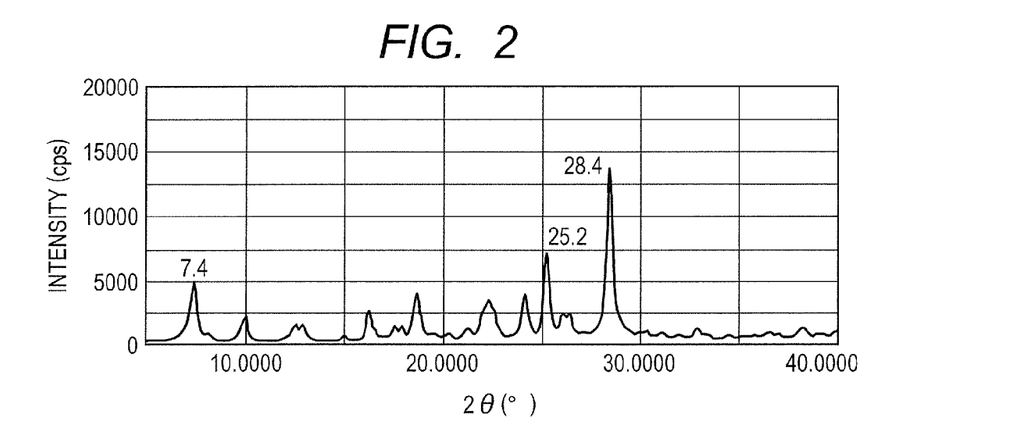
FIG. 2 is a powder X-ray diffraction chart of a hydroxygallium phthalocyanine crystal obtained in Example 1-1.

Hydroxygallium phthalocyanine was prepared by the same treatment as in the synthesis example 1 and the subsequent example 1-1 described in Japanese Patent Application Laid-Open No. 2011-94101. Then, 0.5 parts of the hydroxygallium phthalocyanine, 1.0 part of the exemplary compound (1) (product code: D1575, made by Tokyo Chemical Industry Co., Ltd.), and 9.5 parts of N,N-dimethylformamide were put in a ball mill with 15 parts of glass beads having a diameter of 0.8 mm so as to be milled at room temperature (23° C.) for 48 hours. A hydroxygallium phthalocyanine crystal was produced from the dispersion liquid using N,N-dimethylformamide. In filtration, the strainer was sufficiently cleaned with tetrahydrofuran. The filter residue was vacuum dried so that 0.5 parts of hydroxygallium phthalocyanine crystal was obtained. The powder X-ray diffraction chart of the produced hydroxygallium phthalocyanine crystal is illustrated in FIG. 2.

By NMR measurement, it was confirmed based on the conversion from proton ratio that 0.39% by mass of the exemplary compound (1) and 1.83% by mass of N,N-dimethylformamide were contained in the hydroxygallium phthalocyanine crystal. Since the exemplary compound (1) is soluble in N,N-dimethylformamide, it was found that the exemplary compound (1) was contained in the hydroxygallium phthalocyanine crystal.

Example 1-2

Except that the exemplary compound (1) in Example 1-1 was replaced with the exemplary compound (3) produced in the synthesis example 1, 0.45 parts of hydroxygallium phthalocyanine crystal was obtained by the same treatment as in Example 1-1. The powder X-ray diffraction chart of the produced hydroxygallium phthalocyanine crystal was the same as in FIG. 2.

By NMR measurement, it was confirmed that 0.42% by mass of the exemplary compound (3) and 1.83% by mass of N,N-dimethylformamide were contained in the hydroxygallium phthalocyanine crystal. Since the exemplary compound (3) is soluble in N,N-dimethylformamide, it was found that the exemplary compound (3) was contained in the hydroxygallium phthalocyanine crystal.

Example 1-3

Except that 1.0 part of the exemplary compound (3) in Example 1-2 was replaced with 0.5 parts of the same, 0.45 parts of hydroxygallium phthalocyanine crystal was obtained by the same treatment as in Example 1-2. The powder X-ray diffraction chart of the produced hydroxygallium phthalocyanine crystal was the same as in FIG. 2.

By NMR measurement, it was confirmed that 0.23% by mass of the exemplary compound (3) and 1.89% by mass of N,N-dimethylformamide were contained in the hydroxygallium phthalocyanine crystal.

Reference Example 1-1

Figure 3:
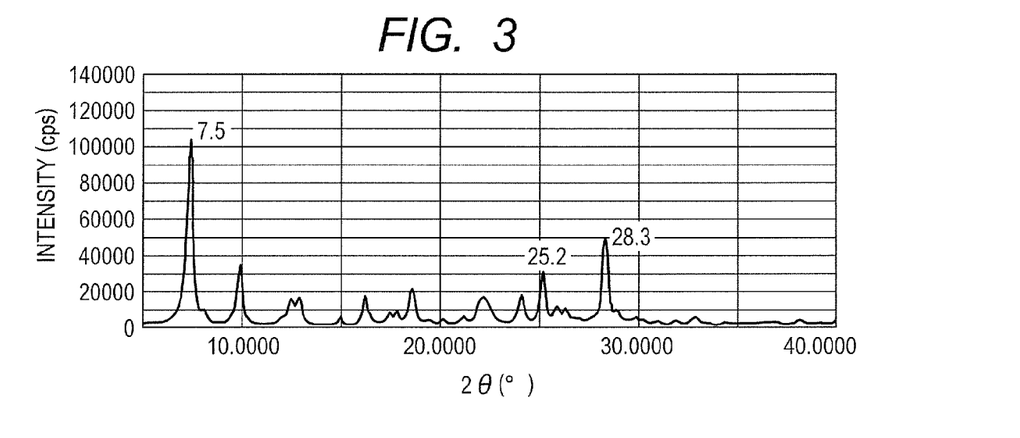
FIG. 3 is a powder X-ray diffraction chart of a hydroxygallium phthalocyanine crystal obtained in Reference example 1-1.

Except that 1.0 part of the exemplary compound (1) in Example 1-1 was not added, 0.4 parts of hydroxygallium phthalocyanine crystal was obtained by the same treatment as in Example 1-1. The powder X-ray diffraction chart of the produced hydroxygallium phthalocyanine crystal was illustrated in FIG. 3.

Example 2-1

Firstly, 60 parts of barium sulfate particles coated with tin oxide (trade name: Passtran PC1, made by Mitsui Mining & Smelting Co., Ltd.), 15 parts of titanium oxide particles (trade name: TITANIX JR, made by Tayca Corporation), 43 parts of a resol-type phenol resin (trade name: Phenolite J-325 made by DIC Corporation, solid content: 70% by mass), 0.015 parts of silicone oil (trade name: SH28PA, made by Dow Corning Toray Co., Ltd.), 3.6 parts of silicone resin (trade name: Tospearl 120, made by Momentive Performance Materials Inc.), 50 parts of 2-methoxy-1-propanol, and 50 parts of methanol were put in a ball mill, and dispersed for 20 hours so as to prepare a coating liquid for forming a conductive layer.

The coating liquid for forming a conductive layer was applied on aluminum cylinder (diameter: 24 mm) as a support with immersion coating, and the produced coating film was dried at 140° C. for 30 minutes so that a conductive layer having a film thickness of 15 μm was formed.

Subsequently 10 parts of copolymer nylon resin (trade name: Amilan CM8000, made by Toray Industries, Inc.) and 30 parts of methoxymethylated 6-nylon resin (trade name: Tresin EF-30T, made by Nagase Chemtex Corporation) were dissolved in a mixed solvent of 400 parts of methanol and 200 parts of n-butanol so as to prepare a coating liquid for forming an undercoat layer.

The coating liquid for forming an undercoat layer was applied to the conductive layer with immersion coating, and the produced coating film was dried so that an undercoat layer having a film thickness of 0.5 μm was formed.

Subsequently, 10 parts of the hydroxygallium phthalocyanine crystal (charge generating substance) produced in Example 1-1, 5 parts of polyvinylbutyral (trade name: S-LEC BX-1, made by Sekisui Chemical Co., Ltd.), and 250 parts of cyclohexanone were put in a sand mill with glass beads having a diameter of 1 mm for dispersion treatment for 4 hours. To the dispersion liquid, 250 parts of ethyl acetate was added to dilute it, thereby preparing a for forming a charge generating layer.

The coating liquid for forming a charge generating layer was applied to the undercoat layer with immersion coating. The produced coating film was dried at 100° C. for 10 minutes to form the charge generating layer having a film thickness of 0.16 μm.

Subsequently, 8 parts of a compound (charge transporting substance) represented by the following formula (4) and 10 parts of polycarbonate (trade name: Iupilon Z-200, made by Mitsubishi Engineering-Plastics Corporation) were dissolved in 70 parts of monochlorobenzene so as to prepare a coating liquid for forming a charge transporting layer.

(4)

The coating liquid for forming a charge transporting layer was applied to the charge generating layer by immersion coating. The produced coating film was dried at 110° C. for 1 hour to form a charge transporting layer having a film thickness of 23 μm.

The electrophotographic photosensitive member of Example 2-1 in a cylindrical shape (drum shape) was thus manufactured.

Example 2-2

Except that the hydroxygallium phthalocyanine crystal in preparing the coating liquid for forming a charge generating layer in Example 2-1 was replaced with the hydroxygallium phthalocyanine crystal produced in Example 1-2, the electrophotographic photosensitive member in Example 2-2 was made in the same way as in Example 2-1.

Example 2-3

Except that the hydroxygallium phthalocyanine crystal in preparing the coating liquid for forming a charge generating layer in Example 2-1 was replaced with the hydroxygallium phthalocyanine crystal produced in Example 1-3, the electrophotographic photosensitive member in Example 2-3 was made in the same way as in Example 2-1.

Example 2-4

Except that the preparation of the coating liquid for forming a charge generating layer in Example 2-1 was changed to the following, the electrophotographic photosensitive member in Example 2-4 was made in the same way as in Example 2-1.

Firstly, 10 parts of the hydroxygallium phthalocyanine crystal (charge generating substance) produced in Reference example 1-1, 0.5 parts of the exemplary compound (1), 5 parts of polyvinylbutyral (trade name: S-LEC BX-1, made by Sekisui Chemical Co., Ltd.), and 250 parts of cyclohexanone were put in a sand mill with glass beads having a diameter of 1 mm for dispersion treatment for 4 hours. Then, 250 parts of ethyl acetate was added to the dispersion liquid for dilution, so as to prepare a coating liquid for forming a charge generating layer.

Example 2-5

Except that 0.5 parts of the exemplary compound (I) in preparing the coating liquid for forming a charge generating layer in Example 2-4 was replaced with 1.0 part of the same, the electrophotographic photosensitive member in Example 2-5 was made in the same way as in Example 2-4.

Example 2-6

Except that 0.5 parts of the exemplary compound (I) in preparing the coating liquid for forming a charge generating layer in Example 2-4 was replaced with 0.1 parts of the exemplary compound (3), the electrophotographic photosensitive member in Example 2-6 was made in the same way as in Example 2-4.

Example 2-7

Except that 0.5 parts of the exemplary compound (I) in preparing the coating liquid for forming a charge generating layer in Example 2-4 was replaced with 0.5 parts of the exemplary compound (3), the electrophotographic photosensitive member in Example 2-7 was made in the same way as in Example 2-4.

Example 2-8

Except that 0.5 parts of the exemplary compound (I) in preparing the coating liquid for forming a charge generating layer in Example 2-4 was replaced with 1.0 part of the exemplary compound (3), the electrophotographic photosensitive member in Example 2-8 was made in the same way as in Example 2-4.

Example 2-9

Except that 0.5 parts of the exemplary compound (I) in preparing the coating liquid for forming a charge generating layer in Example 2-4 was replaced with 0.5 parts of the exemplary compound (6), the electrophotographic photosensitive member in Example 2-9 was made in the same way as in Example 2-4.

Example 2-10

Except that 0.5 parts of the exemplary compound (I) in preparing the coating liquid for forming a charge generating layer in Example 2-4 was replaced with 0.5 parts of the exemplary compound (8), the electrophotographic photosensitive member in Example 2-10 was made in the same way as in Example 2-4.

Example 2-11

Except that 0.5 parts of the exemplary compound (I) in preparing the coating liquid for forming a charge generating layer in Example 2-4 was replaced with 0.5 parts of the exemplary compound (9) (product code: D1446, made by Tokyo Chemical Industry Co., Ltd.), the electrophotographic photosensitive member in Example 2-11 was made in the same way as in Example 2-4.

Comparative Example 2-1

Except that the hydroxygallium phthalocyanine crystal in preparing the coating liquid for forming a charge generating layer in Example 2-1 was replaced with the hydroxygallium phthalocyanine crystal produced in Reference example 1-1, the electrophotographic photosensitive member in Comparative Example 2-1 was made in the same way as in Example 2-1.

Comparative Example 2-2

Except that 0.5 parts of the exemplary compound (I) in preparing the coating liquid for forming a charge generating layer in Example 2-4 was replaced with 0.5 parts of acetophenone, the electrophotographic photosensitive member in Comparative Example 2-2 was made in the same way as in Example 2-4.

Comparative Example 2-3

Except that 0.5 parts of the exemplary compound (I) in preparing the coating liquid for forming a charge generating layer in Example 2-4 was replaced with 0.5 parts of 2-(dimethylamino)-1-(4-morpholinophenyl)-2-benzyl-1-butanone, the electrophotographic photosensitive member in Comparative Example 2-3 was made in the same way as in Example 2-4.

Comparative Example 2-4

Except that 0.5 parts of the exemplary compound (I) in preparing the coating liquid for forming a charge generating layer in Example 2-4 was replaced with 0.5 parts of 3-chloro-4-fluoroacetophenone, the electrophotographic photosensitive member in Comparative Example 2-4 was made in the same way as in Example 2-4.

Evaluation of the Electrophotographic Photosensitive Members in Examples 2-1 to 2-11 and Comparative Examples 2-1 to 2-4

The electrophotographic photosensitive members of Examples 2-1 to 2-11 and Comparative Examples 2-1 to 2-4 were evaluated for ghost images.

A laser beam printer made by Hewlett Packard Japan, Ltd (trade name: Color Laser Jet CP3525dn) was modified to use as an electrophotographic apparatus for evaluation. As a result of modification, a pre-exposing light was unlit and charging conditions and the amount of image exposure were variably controlled. In addition, a manufactured electrophotographic photosensitive member was mounted in a process cartridge for cyan color and attached to the station of the process cartridge for cyan, allowing for operation without mounting of process cartridges for other colors to the laser beam printer main body.

In outputting an image, the process cartridge for cyan color alone was attached to the main body so that a single color image was outputted using cyan toner alone.

The charging conditions and the amount of image exposure were adjusted such that the initial potential was set at −500V for a dark part and −100V for a bright part under a normal temperature and normal humidity environment of 23° C./55% RH. In the measurement of the surface potential of a drum-shaped electrophotographic photosensitive member for potential setting, the cartridge was modified and a potential probe (trade name: model 6000B-8, made by Trek Japan Co., Ltd.) was mounted at the development position. The potential at the center of an electrophotographic photosensitive member in a cylindrical shape was measured with a surface potential meter (trade name: model 344, made by Trek Japan Co., Ltd).

Ghost images were then evaluated under the same conditions. Subsequently, a durability test was performed with 1,000 sheets of paper fed through, and ghost images were evaluated immediately after and 15 hours after the durability test. Evaluation results under a normal temperature and normal humidity environment are described in Table 1.

Subsequently, the electrophotographic photosensitive member was left to stand under a low temperature and low humidity environment of 15° C./10% RH together with the electrophotographic apparatus for evaluation for 3 days so as to evaluate ghost images. A durability test was performed with 1,000 sheets of paper fed through under the same conditions, and ghost images were evaluated immediately after and 15 hours after the durability test. Evaluation results under the low temperature and low humidity environment are also described in Table 1.

In the durability test with paper fed through, an image of character E with a coverage rate of 1% was formed on a plain paper of A4 size with cyan single color.

Ghost images were evaluated as follows. The evaluation was performed based on the ghost images on 8 sheets in total outputted in succession in the following order: outputting a solid white image on a first sheet, outputting 4 types of ghost charts on respective 4 sheets in total, outputting a solid black image on a sheet, and outputting the 4 types of ghost charts on respective 4 sheets in total once again. The ghost chart includes 4 solid black square images of 25 mm side arranged in parallel at equal intervals in the 30 mm-width region from the starting position of printed images (10 mm from the top edge of paper) as a solid white background. In the region below the 30 mm-width region from the starting position of printed images, 4 types of halftone printing patterns were printed so as to be classified into ranks.

The 4 types of ghost charts are charts arranged in the region below the 30-mm width region from the starting position of printed images, with only difference in halftone pattern. The halftone patterns include the following 4 types:

(1) a printing pattern (laser exposing) with 1 dot and 1 space in lateral* direction;

(2) a printing pattern (laser exposing) with 2 dots and 2 spaces in lateral* direction;

(3) a printing pattern (laser exposing) with 2 dots and 3 spaces in lateral* direction; and (4) a printing pattern (laser exposing) of "keima" (similar to knight's jump) pattern (a pattern with 2 dots printed in 6 squares, like the move of a "keima" piece in Japanese chess similar to the knight jump direction).

*: The lateral direction means the scanning direction of a laser scanner (the horizontal direction of an outputted sheet).

The ghost images were classified into ranks as follows. It was determined that the effect of the present invention was insufficient in the ranks 4, 5 and 6.

Rank 1: No ghosting was visible in any of the ghost charts.

Rank 2: Ghosting was vaguely visible in a specific ghost chart.

Rank 3: Ghosting was vaguely visible in any of the ghost charts.

Rank 4: Ghosting was visible in a specific ghost chart.

Rank 5: Ghosting was visible in any of the ghost charts.

Rank 6: Ghosting was sharply visible in a specific ghost chart.

TABLE 1

| | Evaluation results of ghost image | | | | | |
|---|---|---|---|---|---|---|
| | Under normal temperature and normal humidity environment | | | Under low temperature and low humidity environment | | |
| | Initial stage Ghosting rank | Immediately after durability test Ghosting rank | 15 hours after durability test Ghosting rank | Initial stage Ghosting rank | Immediately after durability test Ghosting rank | 15 hours after durability test Ghosting rank |
| Example 2-1 | 1 | 2 | 2 | 2 | 3 | 3 |
| Example 2-2 | 1 | 2 | 2 | 2 | 2 | 2 |
| Example 2-3 | 1 | 2 | 2 | 2 | 2 | 2 |
| Example 2-4 | 2 | 3 | 3 | 3 | 3 | 3 |
| Example 2-5 | 2 | 2 | 3 | 3 | 3 | 3 |
| Example 2-6 | 2 | 2 | 2 | 2 | 3 | 3 |
| Example 2-7 | 1 | 2 | 2 | 2 | 3 | 3 |
| Example 2-8 | 1 | 2 | 2 | 2 | 3 | 3 |
| Example 2-9 | 2 | 2 | 2 | 2 | 3 | 3 |
| Example 2-10 | 2 | 2 | 2 | 3 | 3 | 3 |
| Example 2-11 | 2 | 3 | 3 | 3 | 3 | 3 |
| Comparative Example 2-1 | 4 | 5 | 4 | 5 | 6 | 5 |
| Comparative Example 2-2 | 4 | 5 | 4 | 5 | 5 | 5 |
| Comparative Example 2-3 | 5 | 5 | 5 | 5 | 6 | 6 |
| Comparative Example 2-4 | 5 | 5 | 5 | 5 | 6 | 6 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-273727, filed Dec. 14, 2012, and No. 2013-242104, filed Nov. 22, 2013 which are hereby incorporated by reference herein in their entirety.

What is claimed is:

1. An electrophotographic photosensitive member comprising:
a support; and
a charge generating layer and a charge transporting layer formed on the support;
wherein the charge generating layer comprises:
a charge generating substance; and
an amine compound represented by the following formula (1);

(1)

where,
$R^1$ to $R^5$ each independently represents a hydrogen atom, a halogen atom, a hydroxy group, a carboxyl group, an alkoxycarbonyl group, an aryloxycarbonyl group, a substituted or unsubstituted alkyl group, a substituted or unsubstituted alkoxy group, a substituted or unsubstituted aryloxy group, an amino group having a substituent group, or a substituted or unsubstituted cyclic amino group; and
at least one of $R^1$ to $R^5$ is an amino group substituted with a substituted or unsubstituted aryl group,
an amino group substituted with a substituted or unsubstituted alkyl group, or
a substituted or unsubstituted cyclic amino group,
wherein the charge generating substance is a gallium phthalocyanine crystal.

2. The electrophotographic photosensitive member according to claim 1, wherein at least one of $R^1$ to $R^5$ is an amino group substituted with a substituted or unsubstituted alkyl group.

3. The electrophotographic photosensitive member according to claim 2, wherein the amino group substituted with a substituted or unsubstituted alkyl group is a dialkylamino group.

4. The electrophotographic photosensitive member according to claim 3, wherein the dialkylamino group is a dimethylamino group or a diethylamino group.

5. The electrophotographic photosensitive member according to claim 1, wherein the amine compound is an amine compound represented by the following formula (2):

(2)

wherein $R^6$ and $R^7$ each independently represents a methyl group or an ethyl group.

6. The electrophotographic photosensitive member according to claim 1, wherein at least one of $R^1$ to $R^5$ is a substituted or unsubstituted cyclic amino group.

7. The electrophotographic photosensitive member according to claim 6, wherein the substituted or unsubstituted cyclic amino group is a morpholino group or a piperidino group.

8. The electrophotographic photosensitive member according to claim 1, wherein the amine compound is an amine compound represented by the following formula (3):

(3)

9. The electrophotographic photosensitive member according to claim 1, wherein the content of the amine compound in the charge generating layer is 0.1% by mass or more and 20% by mass or less relative to the charge generating substance.

10. The electrophotographic photosensitive member according to claim 1, wherein the gallium phthalocyanine crystal is a hydroxygallium phthalocyanine crystal in a crystalline form having peaks at Bragg angles 2θ of 7.4°±0.3° and 28.2°±0.3° in X-ray diffraction with CuKα radiation.

11. The electrophotographic photosensitive member according to claim 10, wherein the content of the amine compound in the phthalocyanine crystal is 0.05% by mass or more and 3.0% by mass or less.

12. A process cartridge detachably attachable to a main body of an electrophotographic apparatus, wherein the process cartridge integrally supports: an electrophotographic photosensitive member according to claim 1; and at least one device selected from the group consisting of a charging device, a developing device, a transfer device and a cleaning device.

13. An electrophotographic apparatus comprising:
an electrophotographic photosensitive member according to claim 1; with
a charging device, an image exposing device, a developing device and a transfer device.

* * * * *